Jan. 30, 1951        G. NIEMITZ        2,539,792
BELT CONVEYER STRUCTURE
Filed March 4, 1947
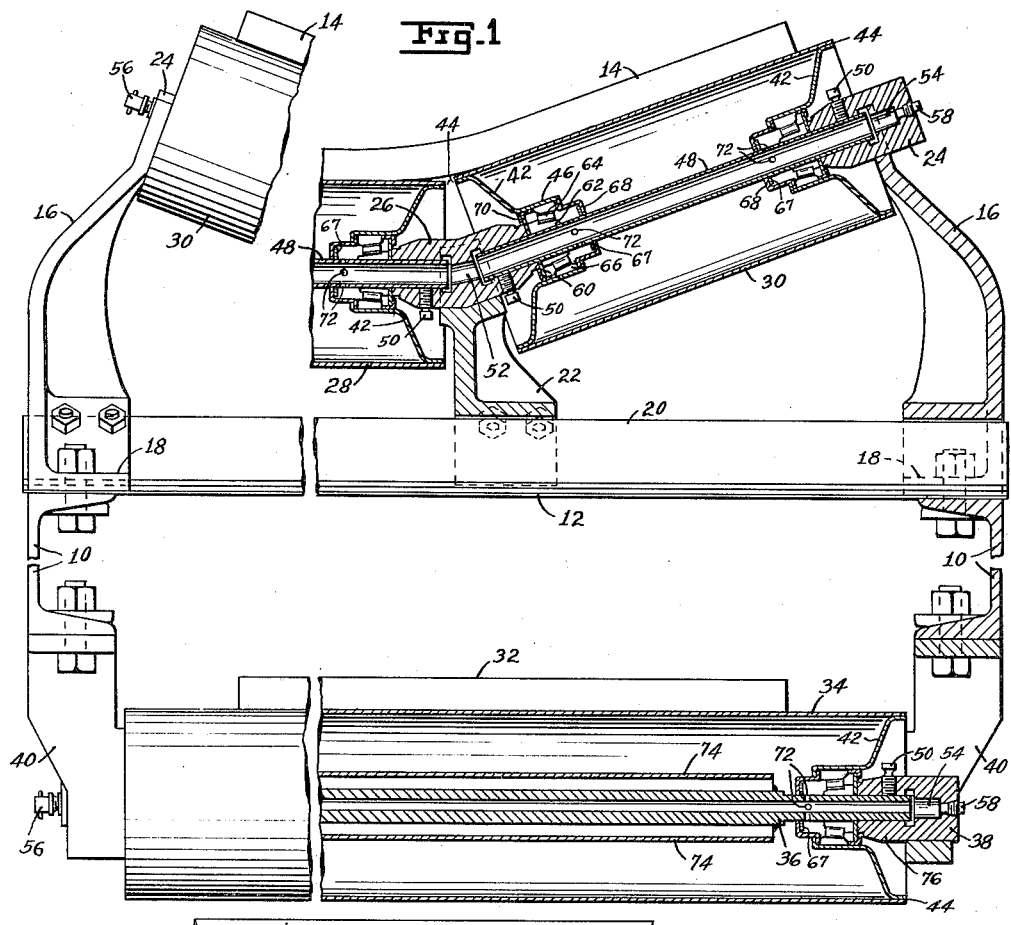
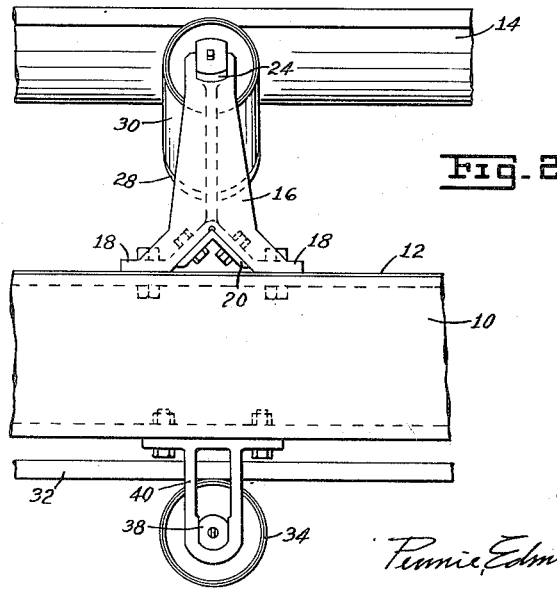
INVENTOR
*Gerhard Niemitz*
BY
*Pennie Edmonds, Morton & Barrows*
ATTORNEYS

Patented Jan. 30, 1951

2,539,792

UNITED STATES PATENT OFFICE 2,539,792

BELT CONVEYER STRUCTURE

Gerhard Niemitz, Bronx, N. Y., assignor to Kennedy-Van Saun Mfg. & Eng. Corp., New York, N. Y., a corporation of Delaware Application March 4, 1947, Serial No. 732,152

2 Claims. (Cl. 308—20)

My invention relates to improvements in belt conveyor structures and more particularly to an improved roller idler structure for carrying the conveyor belt.

Belt conveyor idlers constructed in the past have been made so that their manufacture was rather complicated and so that it was either necessary to lubricate them from both sides of the conveyor structure or provide lubricant tubes extending from one side of the conveyor to the rollers in the center and opposite side. Where lubrication was from both sides of the conveyor it was necessary to provide a runway or walkway on each side of the conveyor.

The primary object of my invention is to provide an improved belt conveyor including an idler roller of improved and simplified construction.

Another object of my invention is to provide an idler roller unit having a structure which greatly facilitates its manufacture and assembly.

In accordance with my invention I provide a belt conveyor including a tubular sheet metal idler roller, a pair of spaced roller bearing units mounted on a shaft extending axially in the roller, and mounting members in which the ends of the shaft are inserted, the improvement comprising an annular dished head of sheet metal secured in each end of the sheet metal roller, each head having a cylindrical portion extending inwardly from the end of the roller and in which the roller bearing unit is mounted, said roller bearing unit including an inner ring fitting said shaft and an outer ring fitting in said cylindrical portion, an annular flange on the inner end of said cylindrical portion extending toward the shaft, a cylindrical sheet metal member surrounding the shaft inwardly of the roller bearing unit and having an annular flange at its outer end extending away from the shaft inside the flange on said cylindrical portion and in engagement therewith and with the inner end of the outer ring of said roller bearing unit, and a metal washer fitted tightly on the shaft within said cylindrical member, said cylindrical member having an annular flange at its inner end extending toward the shaft and engaging the inner face of said metal washer.

The idler roller structure also preferably includes an annular metal disc mounted on the shaft between and in engagement with the inner ring of the roller bearing unit and the mounting member in which the end of the shaft is inserted, and an annular angle ring mounted over the periphery of said disc, said angle ring including an inwardly-extending cylindrical section fitting inside the cylindrical portion of said head adjacent the outer ring of the roller bearing unit and a radial flange extending toward the mounting member and engaging the outer surface of said disc, whereby each roller bearing unit is sealed against the entry of dust.

The improved apparatus of my invention includes other features and details of construction which will be described in the following more complete description of my invention taken in connection with the accompanying drawings which form a part of this application.

In the drawings:

Figure 1 is a broken vertical cross sectional view of a belt conveyor constructed in accordance with the features of my invention;

Figure 2 is a broken side elevational view of a portion of the belt conveyor shown in Figure 1.

Referring to the drawings, the improved conveyor includes a supporting frame structure comprising a pair of spaced channel beams 10, which in turn are carried by pillars or beams or other base supporting means not shown. The channel beams 10 may extend the full length of the conveyor and serve to mount the conveyor on any desired structure. If desired, a deck plate 12 may be provided on the upper surface of the channel beams 10, and on this is mounted a series of belt carrier or idler troughing units which are regularly spaced along the beams and which serve to carry the loaded portion of a belt 14. These carrier or idler units include a pair of outside cast iron brackets 16 which have horizontal flanges 18 by which they are bolted to the upper flanges of the channels 10 respectively. An angle iron cross support 20 is bolted in the members 16 and extends entirely across the conveyor structure to provide a base for supporting intermediate cast iron brackets 22 which are flanged as indicated and bolted directly to the downwardly sloping surfaces of the angle iron support 20.

The upright supports 16 and 22 are of saddle type so that they carry mounting roller spacer members 24 and 26, respectively, which in turn carry the rollers of the unit. These rollers include a horizontal middle roller 28 carried by the spacer members 26, and upwardly inclined side rollers 30, one end of which is carried by a member 24, while the other end is carried by a member 26 as shown in Fig. 1.

The return section 32 of the belt is carried on a roller 34 generally of similar construction to the rollers 28 and 30, the roller 34 being carried on a spindle 36, the ends of which extend into end spacer members 38 carried in cast iron brackets 40 bolted to the under side of the channel beams 10 below the carrier unit.

It will be noted that the members 24 have two flat parallel sides which engage corresponding sides of the upper U-shaped or saddle section of the supporting brackets 16. A similar construction is used for the supporting brackets 40, except that these include a full loop having parallel sides at the lower portion which engage the opposite parallel sides of the members 38. This arrangement, together with a similar structure for the intermediate supporting brackets 22, which are open-topped and of the same U-shaped construction as the top of brackets 16, simplifies the assembly of the rollers.

The belt carrier unit with the three rollers may be assembled as a single unit, since the angle iron beam 20 is bolted directly to and carried by the end brackets 16 as shown more clearly in Fig. 2. If desired, the rollers 28 and 30, together with their supporting spacer members 24 and 26, may be treated as a unit and mounted in the brackets 16 and 22 either before or after the bolting of the supporting brackets 16 to the channel beams 10.

The roller structure for all of the rollers is the same. Each roller includes an outer casing comprising a section of steel tubing of the desired length and, for example, five inches in diameter. This section of steel tubing as, for example, for the roller 30 in Fig. 1, includes an annular dished steel head section 42 at each end which has the form shown with an outer cylindrical section which is secured to the inner peripheral edge of the tube at 44 by spot welding or other suitable method. The member 42 includes a cylindrical hub section 46 of substantially smaller diameter than that of the tube and this terminates in an inwardly projecting annular flange as shown.

Each of the rollers 28 and 30 is mounted on a tube or pipe section 48 which serves as a shaft for the roller. This shaft for the roller 28 is secured in horizontal position in opposite castings 26 by means of set screws 50. A similar structure is provided for the rollers 30, except that one end of the shaft 48 is secured in casting 26 while the opposite end is secured in the casting 24, and held in fixed position by the set screws 50.

The castings 26, which rest in the saddles of the supports 22, are an important feature of my invention and are specially made so that they include a horizontal section as shown in Fig. 1 for mounting the roller 28 and a section at an angle of about 20 degrees for the mounting of a roller 30. The casting 26 is drilled to receive the shafts 48 and these openings or bores are connected by a passageway 52 for the flow of lubricant, so that the set of three rollers comprising the upper unit may be lubricated directly from one side of the conveyor by the flow of lubricant through the three shafts 48. The castings 24 are each drilled to receive a shaft 48 and also to provide a passageway 54 through the end, so that a lubricant fitting 56 may be threaded in on one side of the conveyor and the opening 54 at the opposite side closed by a plug 58.

One method of assembling the rollers in the units may be illustrated in connection with a description of the structure and method of assembly of a roller 30 shown in section in Fig. 1. Let it be assumed that the castings 26 are in position in the supports 22, and that the roller 28 has already been installed. The shaft 48 for a roller 30 is first inserted in the casting 26 and secured in fixed position by the set screw 50 after which an annular metal disc 60 is slipped on the shaft 48 and positioned against the end of the casting 26. A roller bearing unit comprising an inner stationary ring 62, rollers 64 and an outer rotatable ring 66 is slid onto the shaft 48 and moved against the disc 60 so that the stationary ring 62 bears thereagainst. After the roller bearing unit is in place, a tight fitting metal washer 67 is forced on the tubular shaft 48 to about the position shown, then an end closure member 68 of substantially Z-shaped half cross section is placed on the shaft 48 so that its outwardly extending annular flange is in engagement with the rotatable ring 66 of the roller bearing unit. The inwardly projecting flange of the member 68 fits snugly against the outer surface of ring 67 and around the shaft 48.

With the foregoing elements in place on the lower end of the hollow shaft 48, the shell of the roller 30, together with the installed elements 42, is placed over the shaft 48 so that the horizontal hub section 46 snugly engages the ring 66 and the inwardly projecting flange of the member 42 overlies and engages the outwardly projecting flange of the member 68. The lower roller bearing unit of the roller 30 is finally sealed in with an annular angle ring 70 which bears against the disc 60, with its horizontal section snugly fitting the horizontal section 46. This ring 70 is, of course, placed on the shaft 48 prior to the disc 60 if the assembly is effected in the manner described above.

With the lower roller bearing unit in place in the horizontal section 46, the upper unit together with the enclosing metal plate members may be assembled in reverse order after which the spacer casting 24 is slipped onto the end of the shaft 48 and secured thereto by means of the set screws 50. The roller, however, may be assembled in various ways. For example, the rings or washers 67 may be driven on after the elements 42 and 68 are on the shaft 48 so that the rings 67 of each roller is in place against elements 68. The roller bearing units may be assembled in the members 42 and the elements 60 and 70 pressed on the shaft and into the element 42 respectively. The assembly is then mounted in members 24 and 26.

The rollers of the present invention are of such a nature that they may be readily manufactured to the desired precise dimensions by stamping out the various elements 42, 60, 67, 68 and 70 from metal of proper thickness. In operation the elements 60, 62 and 67 are stationary while the elements 68 and 70 which engage the members 42, rotate with the roller. The members 67—68 and 60—70 are very important because they seal in the roller bearing unit, prevent entry of dust, and largely retain the lubricant which is forced into the roller bearing units from the hollow shaft 48 through one or more openings or ports 72. The rings 60 and 67 fit the shaft so tightly that they are driven on. When the set screws 50 are set up in the position shown, for example, for the roller 30 in Fig. 1, the assembled roller bearing units are positively held in position because they are retained against movement towards each other by the inwardly projecting flange of the members 42 and are held against movement away from each other by the fact that the spacer castings 24 and 26 bear against the discs or rings 60, these castings being notched at their inner ends so as not to interfere with the rotation of the angle or flanged rings 70, except to prevent them from moving out appreciably.

The return idler or roller 34 is constructed of almost exactly the same elements as the rollers 28 and 30. However, the hollow or bored shaft 36 is somewhat heavier than the shafts 48 because of its relatively greater length. In addition, the shaft 36 is stiffened by securing thereto three or more angle stiffeners 74 which may be welded to the shaft 36 as indicated. It will be noted that in connection with the roller 34 the shaft 36 is mounted in end spacer castings 38 and that these castings are provided respectively with a plug 58 and a lubricant fitting 56, for example, of the pin type as shown. The shaft 36 is drilled and provided with the ports 72 so that the roller 34 may be lubricated from the same side of the conveyor as the upper roller unit.

The cast iron spacer members 38 are made so that their outer portions fit in the brackets 40 while their inner portions at 76 are of slightly larger diameter to prevent endwise movement of the roller unit in the brackets. Fig. 2 shows the bracket 40 with a substantially wider opening above the casting 38, which facilitates assembly of the return roller unit, since the castings 38 may be dropped into place in the brackets 40. The rollers 28 and 30 of the carrier unit keep their place in the supporting brackets 16 and 22 because of the opposite and downward thrust of the rollers 30, and because of the unitary structure of the spacer castings 26, which serve to tie the rollers together and at the same time provides a novel system for lubricating the ball bearing units of all the rollers 28 and 30 from one side of the conveyor. Furthermore, the unitary structure of the castings 26 aids in keeping the rollers 30 in alignment with respect to the middle roller 28.

These and other advantages may be achieved by employing the features of the present invention even though certain modifications may be made in the specific details and structure of the belt conveyor. Such modifications, however, are contemplated as coming within the spirit and scope of the appended claims.

What I claim as new is:

1. In a belt conveyor including a tubular sheet metal idler roller, a pair of spaced roller bearing units mounted on a shaft extending axially in the roller, and mounting members in which the ends of the shaft are inserted, the improvement comprising an annular dished head of sheet metal secured in each end of the sheet metal roller, each head having a cylindrical portion extending inwardly from the end of the roller and in which the roller bearing unit is mounted, said roller bearing unit including an inner ring fitting said shaft and an outer ring fitting in said cylindrical portion, an annular flange on the inner end of said cylindrical portion extending toward the shaft, a cylindrical sheet metal member surrounding the shaft inwardly of the roller bearing unit and having an annular flange at its outer end extending away from the shaft inside the flange on said cylindrical portion and in engagement therewith and with the inner end of the outer ring of said roller bearing unit, a metal washer fitted tightly on the shaft within said cylindrical member, said cylindrical member having an annular flange at its inner end extending toward the shaft and engaging the inner face of said metal washer, an annular metal disc mounted on said shaft between and in engagement with the inner ring of the roller bearing unit and the mounting member in which the end of the shaft is inserted, and an annular angle ring mounted over the periphery of said disc said angle ring including an inwardly-extending cylindrical section fitting inside the cylindrical portion of said head adjacent the outer ring of the roller bearing unit and a radial flange extending toward the mounting member and engaging the outer surface of said disc, whereby each roller bearing unit is sealed against the entry of dust.

2. In a belt conveyor including a tubular sheet metal idler roller, a pair of spaced roller bearing units mounted on a shaft extending axially in the roller, and mounting members in which the ends of the shaft are inserted, the improvement comprising an annular dished head of sheet metal secured in each end of the sheet metal roller, each head having a cylindrical portion extending inwardly from the end of the roller and in which the roller bearing unit is mounted, said roller bearing unit including an inner ring fitting said shaft and an outer ring fitting in said cylindrical portion, an annular flange on the inner end of said cylindrical portion extending toward the shaft, a cylindrical sheet metal member surrounding the shaft inwardly of the roller bearing unit and having an annular flange at its outer end extending away from the shaft inside the flange on said cylindrical portion and in engagement therewith and with the inner end of the outer ring of said roller bearing unit, and a metal washer fitted tightly on the shaft within said cylindrical member, said cylindrical sheet metal member having an annular flange at its inner end extending toward the shaft and engaging the inner face of said metal washer.

GERHARD NIEMITZ.

REFERENCES CITED

The following references are of record in the file of this patent:

UNITED STATES PATENTS

| Number | Name | Date |
|---|---|---|
| 1,446,312 | Mellin | Feb. 20, 1923 |
| 1,499,832 | Landahl et al. | July 1, 1924 |
| 1,772,711 | Dull | Aug. 12, 1930 |
| 1,833,179 | Robins | Nov. 24, 1931 |
| 1,958,412 | Andrada et al. | May 15, 1934 |
| 2,022,272 | Bradley | Nov. 26, 1935 |
| 2,074,901 | Gotthardt et al. | Mar. 23, 1937 |
| 2,207,790 | Fairbairn et al. | July 16, 1940 |
| 2,437,499 | Benjamin | Mar. 9, 1948 |